(12) United States Patent
Koeck et al.

(10) Patent No.: US 11,125,768 B2
(45) Date of Patent: Sep. 21, 2021

(54) ANGLE BASED SPEED SENSOR DEVICE

(71) Applicant: Infineon Technologies AG, Neubiberg (DE)

(72) Inventors: Helmut Koeck, Villach (AT); Leo Aichriedler, Puch (AT); Dirk Hammerschmidt, Finkenstein (AT); Andrea Monterastelli, Villach (AT); Friedrich Rasbornig, Klagenfurt (AT); Peter Slama, Klagenfurt (AT); Dietmar Spitzer, Voelkermarkt (AT); Tobias Werth, Villach (AT); Harald Witschnig, Landskron (AT)

(73) Assignee: Infineon Technologies AG, Neubiberg (DE)

( * ) Notice: Subject to any disclaimer, the term of this patent is extended or adjusted under 35 U.S.C. 154(b) by 742 days.

(21) Appl. No.: 15/655,443

(22) Filed: Jul. 20, 2017

(65) Prior Publication Data
US 2017/0315146 A1   Nov. 2, 2017

Related U.S. Application Data

(63) Continuation-in-part of application No. 14/306,442, filed on Jun. 17, 2014, now Pat. No. 10,222,234.

(51) Int. Cl.
*G01P 3/487*    (2006.01)
*G01D 5/14*    (2006.01)
(Continued)

(52) U.S. Cl.
CPC .............. *G01P 3/487* (2013.01); *G01C 21/10* (2013.01); *G01C 25/005* (2013.01); *G01D 5/145* (2013.01);
(Continued)

(58) Field of Classification Search
None
See application file for complete search history.

(56) References Cited

U.S. PATENT DOCUMENTS

| 5,361,630 A | 11/1994 | Kowalski |
| 5,705,748 A | 1/1998 | Moench |

(Continued)

FOREIGN PATENT DOCUMENTS

| CN | 201348929 Y | 11/2009 |
| DE | 19722016 A1 | 12/1998 |

(Continued)

OTHER PUBLICATIONS

Non-Final Office Action dated Nov. 9, 2015 for U.S. Appl. No. 14/221,570.

(Continued)

*Primary Examiner* — Jermele M Hollington
(74) *Attorney, Agent, or Firm* — Eschweiler & Potashnik, LLC

(57) ABSTRACT

A sensor device is provided with a magnetic field sensitive element being positioned in a magnetic field of a magnet. The magnetic field sensitive element is configured to sense an orientation angle of the magnetic field in the range between 0° and 360° and generate a sensing signal. The electronic circuitry is configured to receive and process the sensing signal from the magnetic field sensitive element to generate an angle signal indicating the orientation angle of the magnetic field.

14 Claims, 8 Drawing Sheets

(51) Int. Cl.
  *G01C 21/10* (2006.01)
  *G01C 25/00* (2006.01)
  *G01L 3/10* (2006.01)
  *G01D 5/244* (2006.01)
  *G01D 5/246* (2006.01)
  *G01D 5/245* (2006.01)

(52) U.S. Cl.
  CPC ............ *G01D 5/244* (2013.01); *G01D 5/246* (2013.01); *G01D 5/2454* (2013.01); *G01L 3/101* (2013.01)

(56) References Cited

U.S. PATENT DOCUMENTS

| | | | |
|---|---|---|---|
| 6,212,783 B1 | 4/2001 | Ott et al. | |
| 6,326,781 B1* | 12/2001 | Kunde | G01D 5/145 324/144 |
| 6,859,002 B2 | 2/2005 | Desbiolles | |
| 7,814,874 B2 | 10/2010 | Kubani et al. | |
| 8,109,136 B2 | 2/2012 | Moessner | |
| 8,729,892 B2* | 5/2014 | Friedrich | G01R 33/0005 324/247 |
| 8,736,257 B2 | 5/2014 | Granig et al. | |
| 9,007,054 B2* | 4/2015 | Friedrich | G01R 33/0094 324/207.2 |
| 9,816,838 B2* | 11/2017 | Jost | G01D 5/20 |
| 9,852,832 B2* | 12/2017 | Sirohiwala | G01D 5/145 |
| 10,222,234 B2* | 3/2019 | Spitzer | G01B 7/30 |
| 10,718,633 B2* | 7/2020 | Spitzer | G01D 5/142 |
| 2003/0057941 A1 | 3/2003 | Collier-Hallman | |
| 2004/0189285 A1* | 9/2004 | Uenoyama | G01D 5/147 324/207.12 |
| 2004/0235606 A1 | 11/2004 | Brossard | |
| 2005/0217355 A1 | 10/2005 | Wildman | |
| 2007/0245989 A1 | 10/2007 | Nguyen et al. | |
| 2007/0261670 A1 | 11/2007 | Nguyen et al. | |
| 2009/0139478 A1 | 6/2009 | Dell et al. | |
| 2009/0183701 A1 | 7/2009 | Nguyen et al. | |
| 2009/0190283 A1 | 7/2009 | Hammerschmidt et al. | |
| 2009/0309441 A1 | 12/2009 | Yang et al. | |
| 2011/0073054 A1 | 3/2011 | Metcalf et al. | |
| 2011/0187351 A1 | 8/2011 | Hunger | |
| 2011/0309824 A1 | 12/2011 | Takahashi | |
| 2012/0249133 A1* | 10/2012 | Friedrich | G01R 33/072 324/247 |
| 2012/0291545 A1 | 11/2012 | LeMerise | |
| 2013/0238278 A1* | 9/2013 | Shoemaker | G01D 5/145 702/145 |
| 2013/0291545 A1 | 11/2013 | Innes et al. | |
| 2013/0335070 A1 | 12/2013 | Abe et al. | |
| 2014/0009043 A1* | 1/2014 | Watanabe | G01D 5/145 310/68 B |
| 2014/0268883 A1 | 9/2014 | Hammerschmidt et al. | |
| 2014/0278224 A1 | 9/2014 | Tronteli | |
| 2015/0022192 A1 | 1/2015 | Ausserlechner | |
| 2015/0226581 A1 | 8/2015 | Schott | |
| 2015/0268065 A1* | 9/2015 | Slama | G01D 5/145 123/90.31 |
| 2016/0216132 A1 | 7/2016 | Ausserlechner | |
| 2016/0356628 A1* | 12/2016 | Foletto | G01R 33/072 |
| 2018/0017418 A1 | 1/2018 | Deak | |
| 2019/0178682 A1* | 6/2019 | Spitzer | G01D 5/2454 |
| 2020/0340830 A1* | 10/2020 | Spitzer | G01D 5/16 |

FOREIGN PATENT DOCUMENTS

| | | |
|---|---|---|
| DE | 19900641 A1 | 1/2000 |
| DE | 10034927 A1 | 2/2002 |
| EP | 2161547 A1 | 3/2010 |
| JP | H08220121 A | 8/1996 |
| JP | 2000351336 A | 12/2000 |
| JP | 2002372405 A | 12/2002 |
| JP | 2006153802 A | 6/2006 |
| JP | 2006163802 A | 6/2006 |
| JP | 2006226816 A | 8/2006 |
| JP | 2008026081 A | 2/2008 |
| JP | 2008533497 A | 8/2008 |
| JP | 2008233090 A | 10/2008 |
| JP | 2011257166 A | 12/2011 |
| JP | 2012002716 A | 1/2012 |
| JP | 2013257231 A | 12/2013 |

OTHER PUBLICATIONS

Notice of Allowance dated Jul. 12, 2015 for U.S. Appl. No. 14/221,570.

Witschnig, et al. "A Fully Monolithic Integrated Anisotropic Megnetoresistance Based Angle Sensor for Automotive." Transducers 2013, Barcelona, Spain, Jun. 16-20, 2013.

Non-Final Office Action dated Jan. 19, 2017 for U.S. Appl. No. 14/306,442.

Final Office Action dated Mar. 24, 2016 for U.S. Appl. No. 14/221,570.

Non Final Office Action dated Aug. 3, 2017 in connection with U.S. Appl. No. 14/306,442.

Final Office Action dated Feb. 20, 2018 in connection with U.S. Appl. No. 14/306,442.

Liang, Chen et al.; "Design and Realization of Inductosyn Angle Measuring System Based on CORDIC Algorithm" Proceedings of the 23rd Symposium on Testing and Fault Diagnosis Technologies; Aug. 2014; Translation dated Jul. 21, 2021.

* cited by examiner

ANGLE BASED SPEED SENSOR DEVICE

CROSS REFERENCE TO RELATED APPLICATIONS

This application is a continuation-in-part of U.S. application Ser. No. 14/306,442 filed on Jun. 17, 2014, now U.S. Pat. No. 10,222,234 the contents of which are incorporated by reference in their entirety.

FIELD

The present application relates to a sensor device and to a sensing system and to a method of processing a sensing signal.

BACKGROUND

In various technological fields the rotation of a shaft is sensed. Various control functionality may rely on the sensed rotation of the shaft. For example, a rotational speed or angular velocity of a shaft of a transmission may be used to control the operation of the transmission. For example, an angular velocity of a shaft of a wheel axle may be used to monitor friction of the corresponding wheel; this may be useful for antiblocking systems or electronic stability systems in vehicles.

A known way of sensing rotation of the shaft is to place a ferromagnetic toothed wheel on the shaft and use a sensor to detect passing of teeth of the toothed wheel. Typically, the sensor is placed at a distance from the rotational axis of the shaft; often, the sensor is placed radially offset from the ferromagnetic toothed wheel. The output of such sensor typically corresponds to a pattern of pulses in which the frequency of pulses varies according to the speed of rotation. By giving the different teeth of the toothed wheel a size which is distinctive with respect to other teeth of the toothed wheel, it becomes also possible to distinguish between different angular positions in the course of a single rotation of the shaft. It is for example conceivable to make just one of the teeth different from the other, so that an angular position of the toothed wheel may be identified. Without any limitation, more than one of the teeth may be made identifiable whereby more than one of the angular positions are made identifiable.

However, evaluation of the rotation angle using such toothed wheel requires that the shaft is actually rotating. Sometimes, at least one full rotation is needed to determine the absolute orientation. Further, complex algorithms may be needed for accurately estimating the rotation angle from the sensed pattern of pulses. Also, the achievable accuracy may significantly depend on a manufacturing accuracy of the toothed wheel as well as a precision in mounting the sensor relative to the toothed wheel. Still further, the toothed wheels—sometimes also referred to as magnetic encoder wheels—may require significant space and may be comparably expensive.

Accordingly there is a need for techniques which allow for sensing rotation of a shaft in an efficient and accurate manner.

SUMMARY

According to some embodiments, a sensor device is provided. The sensor device may comprise a magnetic field sensitive element to be positioned in a magnetic field of a magnet positioned on an end face of a shaft, the magnetic field sensitive element being configured to sense an orientation angle of the magnetic field in the range between 0° and 360° and generate a sensing signal comprising a first sensing signal component and a second sensing signal component which have a 90° phase shift. The sensor device may further comprise electronic circuitry. The electronic circuitry is configured to receive and process the sensing signal from the magnetic field sensitive element to generate an angle signal indicating the orientation angle of the magnetic field.

According to some further embodiments, a system is provided. The system may comprise a rotatable shaft and a magnet positioned on an end face of the shaft. The system may further comprise a magnetic field sensitive element positioned in a magnetic field of the magnet, the magnetic field sensitive element being configured to sense an orientation angle of the magnetic field in the range between 0° and 360° and generate a sensing signal. The system may further comprise electronic circuitry configured to receive and process the sensing signal from the magnetic field sensitive element to generate an angle signal indicating the orientation angle of the magnetic field. The electronic circuitry is configured to process the sensing signal by selecting different process methods depending on an angular speed of the shaft.

According to some further embodiments, an angular sensing method is provided. The angular sensing method comprises generating a sensing signal by a magnetic field sensitive element, the sensing signal comprising a first sensing signal component and a second sensing signal component which have a 90° phase shift from each other. The angular sensing method further comprises processing the sensing signal by electronic circuitry to generate an angle signal indicating an orientation angle of the magnetic field. The sensing signal is processed to generate the angle signal by selecting different process methods depending on an angular speed of the shaft.

Figure 1:
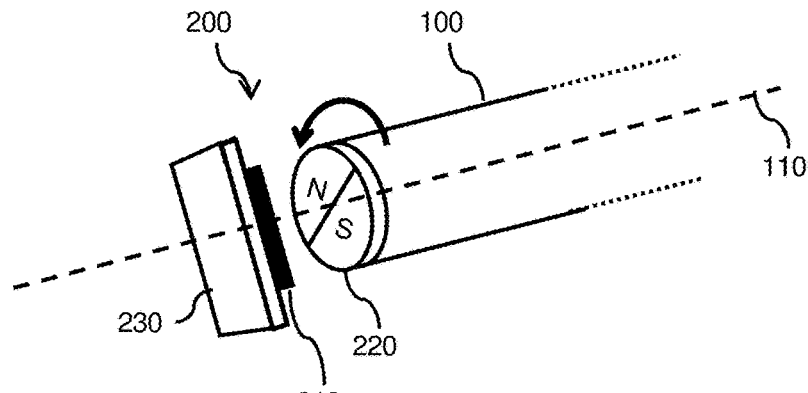
FIG. 1 schematically illustrates a sensor device according to an embodiment of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following, various embodiments will be described in detail with reference to the accompanying drawings. It should be noted that these embodiments serve only as examples and are not to be construed as limiting. For example, while embodiments with a plurality of features, other embodiments may comprise less features and/or alternative features. Furthermore, features from different embodiments may be combined with each other unless specifically noted otherwise.

Embodiments as illustrated in the following relate to techniques of sensing the rotation of a shaft, in particular of a shaft of a transmission of a vehicle, of a shaft of a brushless DC motor, and of a shaft of a wheel axle of a vehicle. The illustrated embodiments cover corresponding sensor devices, systems, and methods.

In the illustrated embodiments, a magnetic field sensitive element is utilized which is positioned in a magnetic field of a magnet. The magnet is positioned on an end face of the shaft. The magnetic field sensitive element is configured to sense an orientation angle of the magnetic field in the range between 0° and 360°. From this angle, it may be possible to unambiguously determine the orientation of the magnetic field.

The magnetic field sensitive element may without any limitation be based on a magnetoresistive effect, such as the Giant Magnetoresistance (GMR) effect, Anisotropic Magnetoresistance (AMR) effect, Tunnel Magnetoresistance (TMR) effect, or Hall effect. An example embodiment of the magnetic field sensitive element could be based on two GMR devices with two different maximum sensitivity directions in a plane which is parallel to the end face of the shaft and perpendicular to a longitudinal direction and rotation axis of the shaft. Such a magnetic field sensitive element may allow for accurate detection of the orientation angle of the magnetic field of a magnet having a magnetization which is orientated perpendicular to the rotation axis of the shaft. In particular, such magnetic field sensitive element may be used in a compass like manner to sense the orientation of the magnetic field of the magnet rotating together with the shaft.

Further, the illustrated embodiments may utilize a stored mapping of pulse edges to orientation angles. In some embodiments, the mapping can be configurable, For example, by programming the memory. Depending on this mapping and the orientation angle of the magnetic field as sensed by the magnetic field sensitive element, a first signal is generated which includes a pattern of pulses with rising and falling pulse edges. Within the first signal the rising and/or falling edges may be mapped to predefined orientation angles as sensed by the magnetic field sensitive element. The first signal may be used to emulate a pulse pattern as generated by a sensor assembly which is based on an asymmetric toothed wheel, as explained before. Such a form of the first thereby achieving compatibility to existing sensor devices relying on such asymmetric toothed wheels.

In addition, the sensed angular orientation may be used to generate a second signal which represents a rotation angle of the shaft in the range between 0° and 360°. In the latter case, the rotation angle may be represented by a digital value, an analog value, or a pulse width modulated signal. The pulse width modulated signal may, in other words, correspond to a pulse width modulated value. Different modes of operation may be provided for outputting either the first signal or the second signal. For example, a sensor device may be provided with a first mode of operation in which the sensor device outputs the first signal and a second mode of operation in which the sensor device outputs the second signal instead of the first signal. Likewise, the sensor may output both of the first signal and the second signal in yet another mode of operation.

In some embodiments, the orientation of the magnetic field as sensed by the magnetic field sensitive element may also be used as a basis for generating further signals. For example, depending on the sensed orientation angle, a further signal may be generated representing an angular speed of the shaft. The angular speed may without any limitation be represented by a digital value, an analog value, or a pulse width modulated signal. The further signal may have a predefined periodicity per revolution of the shaft. In other words, a repetition of basic building blocks—such as pulses or half-waves or full waves—of the signal may amount to a certain predefined number. As a non-limiting example, there may be a number of ten duty cycles per revolution. The predefined periodicity may allow emulating the output of a conventional sensor device operating based on a toothed wheel. The predefined periodicity may correspond to a number of teeth of the emulated toothed wheel.

The above embodiments will now be further explained with reference to the drawings.

FIG. 1 schematically illustrates a sensor device 200 according to an embodiment. The sensor device 200 is configured to sense rotation of a shaft 100, i.e., orientation and/or angular speed. Accordingly, the sensor device 200 in the following will also be referred to as a rotation sensor.

The shaft may be one of a shaft of transmission of a vehicle or a shaft of a brushless DC motor or a shaft of a wheel axle of a vehicle.

In the illustrated embodiment, the sensor device 200 includes a magnetic field sensitive element 210, in the following also referred to as sensor element, and a magnet 220. Further electronic circuitry 230 is provided in the illustrated embodiment. As illustrated, the magnet 220 may be a disc-shaped dipole magnet mounted on an end face of the shaft 100. The magnetization of the magnet 220 (from south pole "S" to north pole "N") is oriented perpendicularly to the longitudinal rotation axis 110 of the shaft 100. The magnetization may correspond to the internally acting magnetic field. A border between North and South pole of the magnet 220 may be oriented perpendicular to the magnetization. Accordingly, when the shaft rotates as indicated by the arrow, the orientation of the magnetic field of the magnet 220 changes in an anti-clockwise manner around the longitudinal rotation axis 110 of the shaft 100 (viewed in FIG. 1 from the distal end of the axis towards the magnet).

As mentioned above, the sensor element 210 may, For example, be based on two GMR devices each having a different maximum sensitivity direction in a plane which is perpendicular to the longitudinal rotation axis 110 of the shaft 100, thereby allowing for sensing the absolute angle of the orientation of the magnetic field in a range from 0° to 360°.

The geometrical shape and the magnetic configuration of the magnet 220 are not particularly limited. As mentioned above, in the scenario of FIG. 1, a disc-shaped element forming a magnetic dipole is shown. One half of the disc forms the magnetic north pole N and the other half of the disc forms the magnetic south pole S. The magnetic axis, i.e., the geometrical connection between north pole S and south pole S, is oriented perpendicular to the axis of the shaft. It is also possible that magnetic multi-pole elements are used which comprise a plurality of north poles and corresponding south poles. This may increase a sensitivity and accuracy in the sensing of the orientation angle of the magnetic field. In such a scenario, the rotation sensor is typically preconfigured with information on a spatial shape of the magnetic field generated by the magnet 220. In one embodiment, it may be desirable to use a flat element which radially extends with respect to the axis of the shaft 100. This may allow sensing of the orientation even in situations where not much space is available. However, it is also possible that an element with a considerable thickness compared to its radial dimension is employed. As shown in the scenario of FIG. 1, a radial dimension of the magnet may be in the order of the radial dimension of the shaft 100. However, in general it is also possible that the radial dimension of magnet 200 is considerably larger or smaller than the radial dimension of the shaft 100. For example, in a scenario, a magnetic pill may be used as the magnet 200. The magnetic pill may be a substantially elongate element where the magnetic poles are situated on opposing ends thereof. Elongate may refer to a substantially 1 d extended element. For example, the magnetic pill may be diametrically magnetized.

As can be seen from FIG. 1, the sensor element 210 is positioned at an axial extension of the shaft 100 (as indicated by the dashed line in FIG. 1) and is offset by a gap with respect to the magnet 220. In particular, the sensor element 210 may be stationary while the shaft 100 rotates, as illustrated in FIG. 1.

Further, the sensor device 200 may include the electronic circuitry 230 which is configured to generate various kinds of output signals from the orientation angle of the magnetic field as sensed by the sensor element 210. In some embodiments, the electronic circuitry 230 is arranged remotely from the sensor element 210 and is configured to have signal communications with the sensor element 210. In some other embodiments, the electronic circuitry 230 is integrated in a chip attached to the sensor element 210. The sensor element 210 and the electronic circuitry 230 may also be arranged on the same semiconductor chip or in the same chip package. Some embodiments of functionalities of the electronic circuitry 230 are further illustrated by the block diagram of FIG. 2 according to some embodiments.

Figure 2:
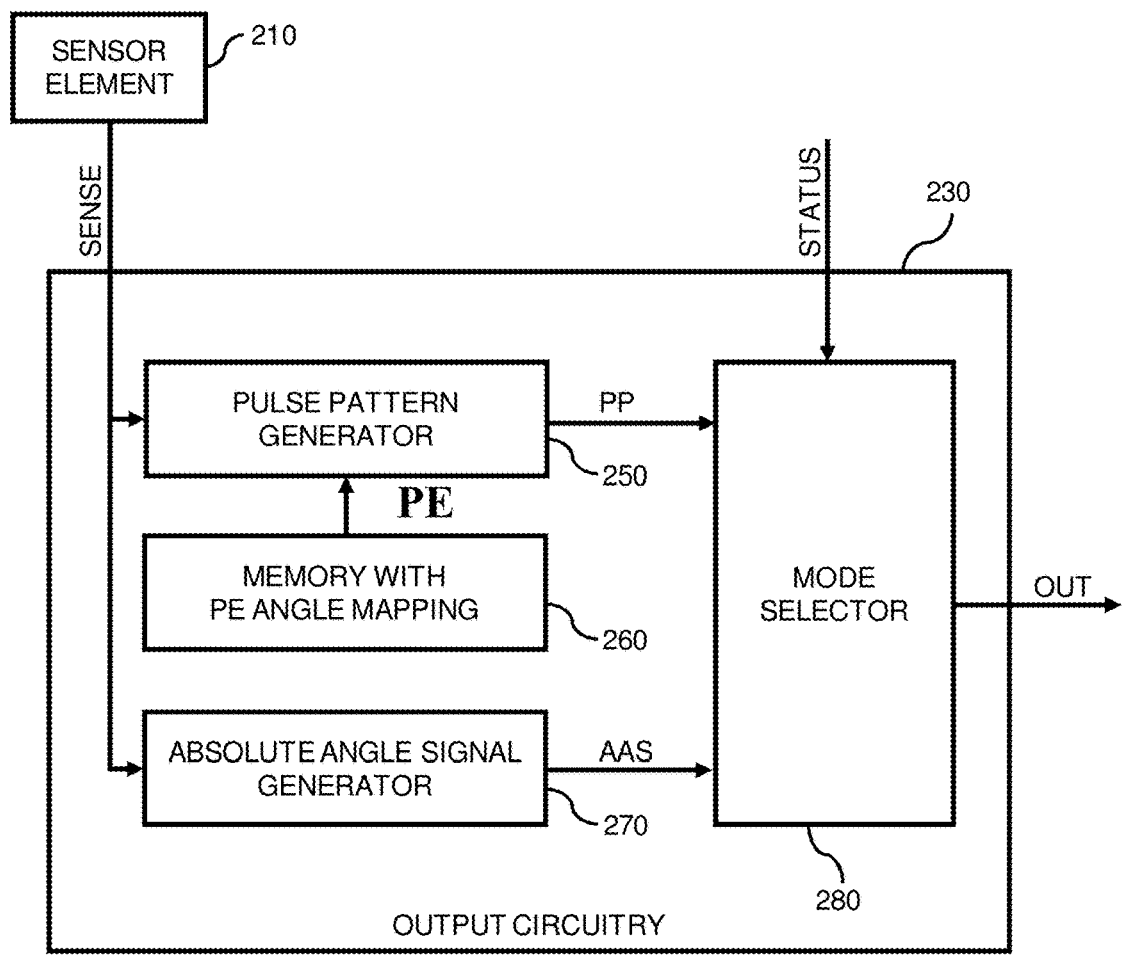
FIG. 2 shows a block diagram for schematically illustrating functionalities of the sensor device according to some embodiments.

As illustrated in FIG. 2, the electronic circuitry 230 may include a pulse pattern generator 250 and a memory 260. The pulse pattern generator 250 is configured to generate a signal PP which includes a pattern of pulses. This is accomplished depending on the sensed orientation angle of the magnetic field, in FIG. 2 represented by signal SENSE, and a pulse edge (PE) angle mapping as stored in the memory 260. The memory 260 may for example be implemented by a suitable type of semiconductor memory, such as a Read Only Memory (ROM), a Programmable ROM (PROM), an Erasable PROM (EPROM), or a flash memory. An embodiment of the memory 260 using PROM, EPROM, or flash memory may be used to allow configuration or even reconfiguration of the PE angle mapping stored in the memory 260.

In the illustrated embodiment, the PE angle mapping stored in the memory 260 defines, for each pulse of the pulse pattern, an orientation angle associated with a rising edge of the pulse and an orientation angle associated with a falling edge of the pulse. Accordingly, the pulse pattern generator 250 may operate by comparing the sensed orientation to the orientation angles in the mapping and, if the sensed orientation angle passes an orientation angle corresponding to a rising edge, switching the value of the signal PP to a high value or, if the sensed orientation angle passes an orientation angle corresponding to a falling edge, switching the value of the signal PP to a low value. In this way, various kinds of pulse patterns may be generated, including highly asymmetric pulse patterns in which, over the course of a complete rotation of the shaft 100, each pulse differs from the other pulses with respect to its duty cycle.

As further illustrated, the electronic circuitry 230 may also include an absolute angle signal generator 270 which is configured to generate a signal AAS which represents the absolute orientation angle of the shaft 100 in the range from 0° to 360°. The signal AAS may, for example, represent the absolute orientation angle of the shaft 100 as an analog value. Further, the signal AAS may encode the absolute orientation angle of the shaft 100 as a digital value or a pulse width modulated signal. The absolute angle signal generator 270 may derive the absolute orientation angle of the shaft 100 from the orientation angle of the magnetic field as sensed by the sensor element by, For example, adding an offset which takes into account the mounting orientation of the magnet 220 on the shaft 100 and/or any further reference offset. The absolute angle signal generator 270 may also perform signal conversion, For example, from an analog representation of the signal SENSE to a digital or pulse width modulated representation of the signal AAS, as non-limiting examples. Alternatively or additionally, the pulse pattern generator 250 may perform the signal conversion.

In some embodiments, the absolute angle signal generator 270 may also be configured to generate one or more further signals from the orientation angle sensed by the sensor element 210. For example, the absolute angle signal generator 270 may generate a signal representing the angular speed of the shaft 100, For example, by calculating the time derivative of the absolute orientation angle of the shaft 100. Optionally, a direction of the rotation may be encoded. In order to emulate the output signal obtained with the conventional sensor element interacting with a toothed wheel, it is, For example, possible that the absolute angle signal generator 270 outputs the signal representing the angular speed of the shaft 100 such that it has a predefined number of periods per revolution of the shaft, as a non-limiting example 12 or 20 periods. Such a signal may be suited to emulate the signal obtained with a conventional absolute angle signal generator interacting with a toothed wheel having a corresponding number of teeth.

As further illustrated, the electronic circuitry 230 of FIG. 2 may include a mode selector 280. The mode selector 280 may be used for selecting different operating modes of the electronic circuitry 230. In particular, the mode selector 280 may be used for selecting a first operating mode, in which the electronic circuitry 230 outputs the signal PP as its output signal OUT. The mode selector 280 may further be used for selecting a second operating mode, in which the output circuitry may output the signal AAS as its output signal OUT. Optionally, the mode selector 280 may be used for selecting a third operating mode, in which the electronic circuitry 230 outputs the further signal which is indicative of the rotational speed.

Various decision criteria used by the mode selector 280 in order to select a particular operating mode are conceivable. For example, in a start-up phase of the rotation of the shaft, the mode selector 280 may select the second operating mode, thereby providing useful information on the rotation angle of the shaft 100 even when the shaft is substantially static, which means that the signal PP may not yet have a sufficient number of pulses for a relation of the rotation angle. After a certain number of rotations of the shaft 100, For example, after one complete rotation, or when an angular speed of the shaft 100 exceeds a threshold value, the mode selector 280 may select the first operation mode, in which the output signal OUT may be generated to emulate an output signal as typically provided by conventional toothed wheel-based rotation sensors.

It is also possible that the electronic circuitry 230 outputs a plurality of signals. For example, the signal AAS may be output and the further signal may be output in one and the same operation mode. Then it may be possible to derive, both, the orientation as well as the rotational speed.

Figure 3A:
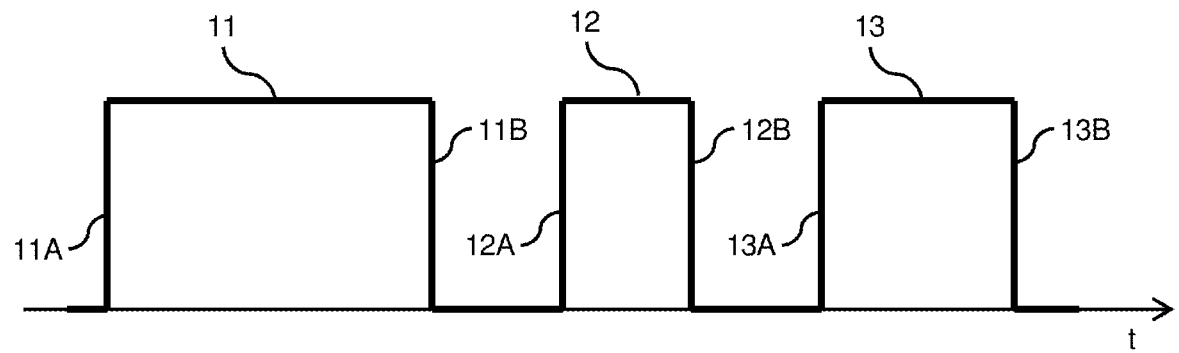
FIG. 3A shows an example pulse pattern in a signal generated by a sensor device according to an embodiment.
Figure 3B:
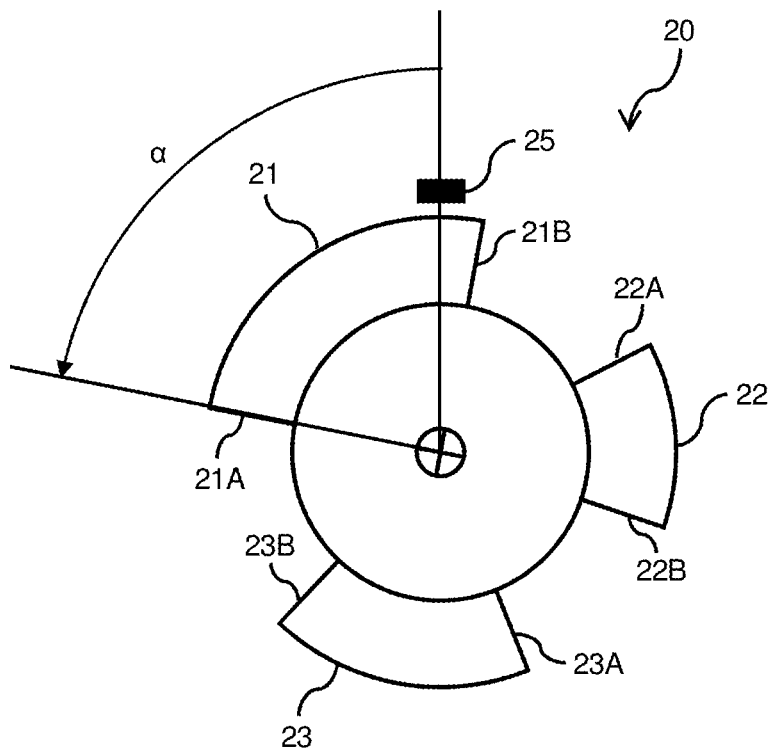
FIG. 3B schematically illustrates a ferromagnetic toothed wheel in combination with a sensor, the ferromagnetic toothed wheel having a profile substantially corresponding to the pulse pattern of FIG. 3A.

An example pulse pattern as included in the signal PP is illustrated in FIG. 3A. This pulse pattern is assumed to emulate an output signal of a rotation sensor 25 arranged in the magnetic field of a toothed wheel 20 as schematically illustrated in FIG. 3B. In the illustrated example, the pulse pattern consists of three pulses 11, 12, 13, having a different duty cycle each. Each pulse 11, 12, 13 corresponds to a particular tooth 21, 22, 23 of a toothed wheel 20 used with rotation sensor 25. In the given example, the pulse 11 corresponds to tooth 21 of the toothed wheel 20, the pulse 12 corresponds to tooth 22 of the toothed wheel 20, and the pulse 13 corresponds to tooth 23 of the toothed wheel 20.

On the toothed wheel 20 shown in FIG. 3B the teeth 21, 22, 23 each have two edges 21A, 21B, 22A, 22B, and 23A, 23B extending in a substantially radial direction with regards to the axis. Each pair of edges 21A, 21B, 22A, 22B, and 23A, 23B defines an angular position and circumferential extension of the respective tooth 21, 22, 23. If during rotation of the toothed wheel 20 the rotation angle α increases, the teeth 21, 22, 23 subsequently pass a sensor 25. For example, the sensor 25 can be a Hall sensor, a GMR sensor, a TMR sensor, or AMR sensor and at least the teeth 21, 22, 23 of the toothed wheel 20 may be formed of a ferromagnetic material. The pulse pattern of a typical output signal of such a system setup is emulated by the signal PP, as illustrated in FIG. 3A. In the illustrated example, the pulse pattern of FIG. 3A has a rising pulse edge 11A of the pulse 11 at a time when the edge 21A of the tooth 21 would pass the sensor 25, and has a falling pulse edge 11B at a time when the edge 21B of the pulse 21 would pass the sensor 25. Similarly, the pulse pattern of FIG. 3A has a rising pulse edge 12A of the pulse 12 at a time when the edge 22A of the tooth 22 would pass the sensor 25, and has a falling pulse edge 12B at a time when the edge 22B of the pulse 22 would pass the sensor 25. Similarly, the pulse pattern of FIG. 3A has a rising pulse edge 13A of the pulse 13 at a time when the edge 23A of the tooth 23 would pass the sensor 25, and has a falling pulse edge 13B at a time when the edge 23B of the pulse 23 would pass the sensor 25.

The electronic circuitry 230 of the illustrated embodiment may achieve emulation by suitably configuring the PE angle mapping stored in the memory 260. For example, when assuming that the edge 21A of the tooth 21 is located at an angular position of 0°, the PE angle mapping may assign a rising pulse edge 11A to the orientation angle of 0°. Similarly, if the edge 21B of the tooth 21 is located at an angular position of 90°, the PE angle mapping may assign falling pulse edge 11B to the orientation angle of 90°. For the other teeth 22, 23 corresponding assignments may be done depending on the angular position and circumferential extension of the teeth 22, 23. In such an assignment of rising and falling pulse edges, also an offset between the orientation angle of the magnetic field and the rotation angle of the shaft 100 may be taken into account. The offset may relate to a difference of the orientation angle and the rotation angle. The offset may be taken into account by a predefined reference angle used for calibration of the PE angle mapping.

It is to be understood that the pulse pattern of FIG. 3A would be repeated with each revolution of the shaft 100. Further, the pulse widths and pauses in the pulse pattern would vary according to the rotation speed of the shaft 100. For example, the ratio of pulses to pauses per revolution may remain constant.

Figure 7A:
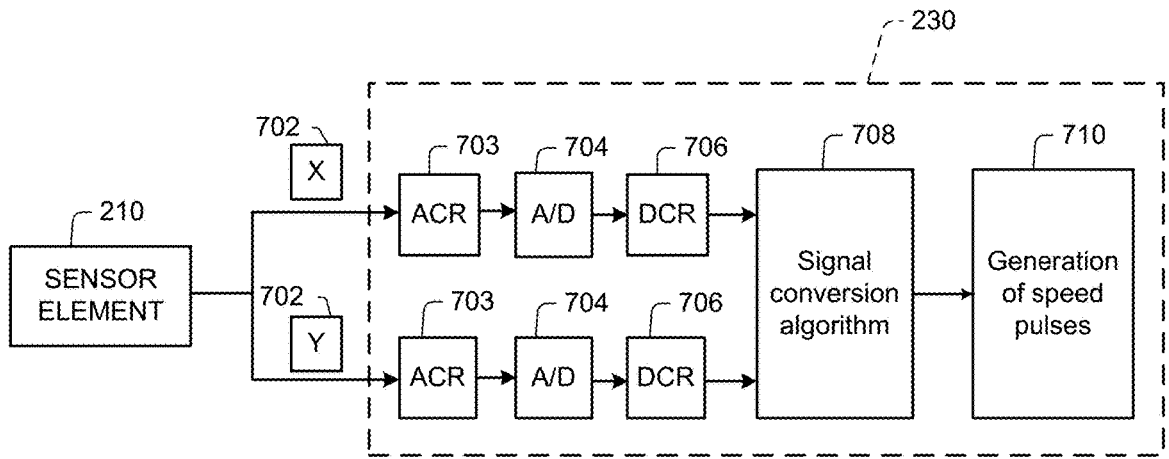
FIG. 7A and FIG. 7B show block diagrams for schematically illustrating functionalities of the sensor device according to some alternative embodiments.
Figure 7B:
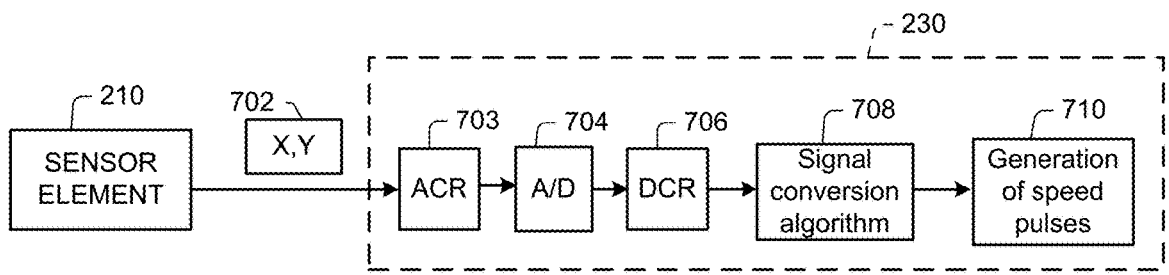

FIG. 7A and FIG. 7B illustrates block diagrams showing some alternative embodiments of functionalities of the electronic circuitry 230 including a threshold based method to compensate for non-linear pulse-width ratio and ambiguous signal information around the minimum and maximum points. As illustrated in the figures, the sensor element 210 senses the rotation of a target (for example, the shaft 100 in FIG. 1) and generates a first sensing signal component X and a second sensing signal component Y as shown by blocks 702. The first sensing signal component X and the second sensing signal component Y are then prepared for rotation angle extraction, including analog correction and optimization functions before converting to digital signals, and digital correction and optimization functions after converting to digital signals. The correction and optimization functions may include but are not limited to filtering, self-calibration, and temperature compensation which can be processed either in analog domain or in digital domain. For example, the first sensing signal component X and the second sensing signal component Y can be respectively fed into analog correction blocks 703 for filtering and self-calibration, then be fed into A/D conversion blocks 704, and then fed into digital correction blocks 706 for temperature compensation. It is understood that the sequence and selection of those correction and optimization functions are not limited to the examples given above. Instead, any applicable sequence and selection of correction and optimization functions are amenable for this application. It is also understood that whether to process the first sensing signal component X and the second sensing signal component Y in parallel (e.g. processing X and Y through separate blocks as shown in FIG. 7A), in sequence (e.g. processing X and Y one after another through a shared function block as shown in FIG. 7B), or in combination (e.g. some of the function blocks are shared while others are separate) can vary depending on applications. Similarly, the correction and optimization processing of the first sensing signal component X and the second sensing signal component Y associated with FIGS. 9A-B and FIGS. 11A-B below is shown in the corresponding figures as non-limiting examples, but other alternative embodiments similar to what are discussed above are amenable.

Figure 8:
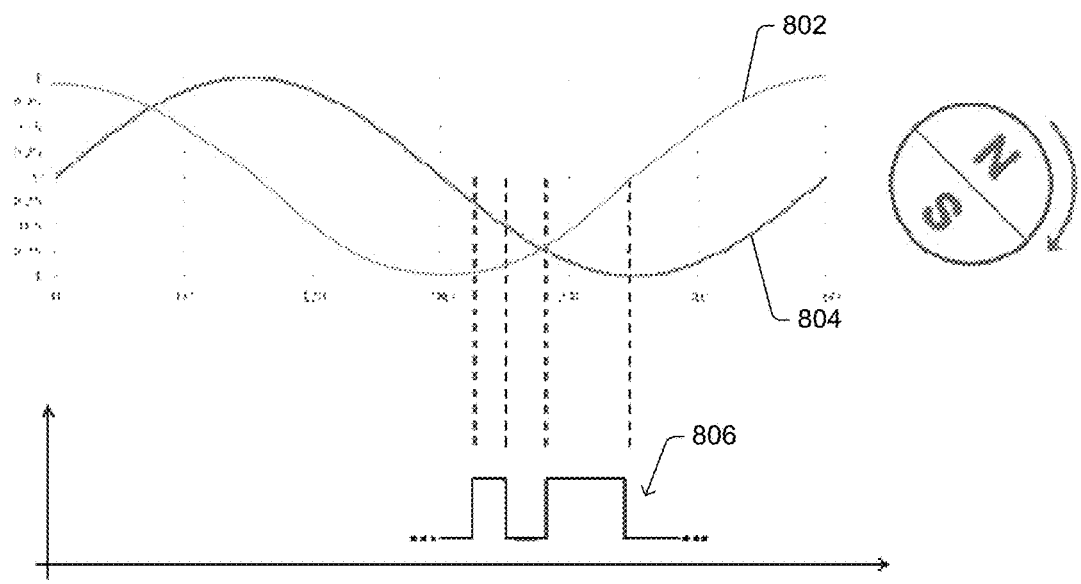
FIG. 8 shows an example signal generated by a sensor device according to some embodiments.

As an example shown in FIG. 8, the result can be (normalized) sine curve Vx(cos α) 802 and cosine curve Vy(sin α) 804 of a voltage amplitude. The generated sensing signal corresponds an orientation angle of the magnetic field in the range between 0° and 360°. The angle α is a rotation angle of the magnetic field, i.e., a rotation angle of the target to be sensed. As shown in FIG. 8, an angle position is extracted from one of the signal components (e.g., the second sensing signal component Vy(sin α)) 804 by a signal conversion algorithm block 708. For instance, for every quarter of the sinusoidal signal a pulse or a series of pulses 806 is generated. The sinusoidal base function causes a non-linear pulse-width ratio of the generated pulse. Compensated threshold values are either stored in a look-up table or a threshold based algorithm to generate correct amplitude values in order to achieve a linearized pulse width and extract correct phase values. The look-up table may be stored in a memory integrated in the electronic circuitry 230, such as a Read Only Memory (ROM), a Programmable ROM (PROM), an Erasable PROM (EPROM), or a flash memory. An embodiment of the memory using PROM, EPROM, or flash memory may be used to allow configuration or even reconfiguration of the look-up table stored in the memory. As the inventor have appreciated, the speed information is not particularly close to the signal minimum and maximum points. To solve this problem, the other signal component (e.g., the first sensing signal component Vx(cos α)) 802 which is 90° phase shifted relative to the above signal component, is added to the signal interpretation. This provides correct speed information for full revolution. With sine and cosine data available a simple threshold based algorithm can be applied to provide unambiguous angle information.

The angle information can be used to generate speed pulse signals (as shown by a generation of speed pulses block 710 in FIG. 7A,B), absolute angle information, direction information, and/or acceleration information (not shown in FIG. 7A,B). For example, in some embodiments, an absolute orientation angle indicating the absolute angle of the target to be sensed can be derived from the orientation angle of the magnetic field as sensed by the sensor element by adding a pre-determined reference offset. The absolute orientation angle can be generated as an analog value, or can be encoded as a digital value or a pulse width modulated signal.

The threshold based method provides flexibility to extract different levels of accuracy. For instance, the accuracy of the speed sensing can be dynamically controlled by selecting large quantization steps during high speed operation and smaller quantization steps at lower speeds. The linearized look-up table values provide equidistant speed pulse signals.

Figure 9A:
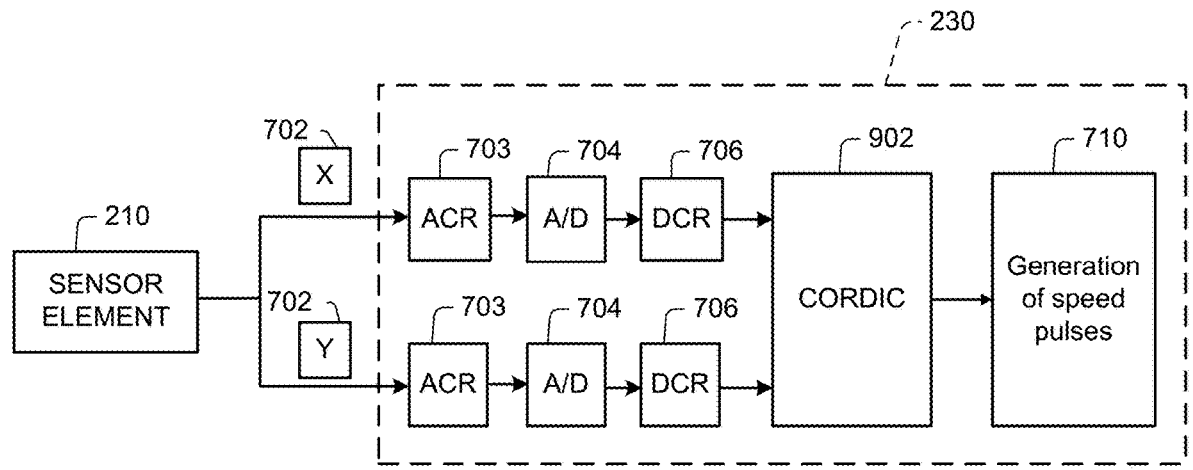
FIG. 9A and FIG. 9B show block diagrams for schematically illustrating functionalities of the sensor device according to some alternative embodiments.
Figure 9B:
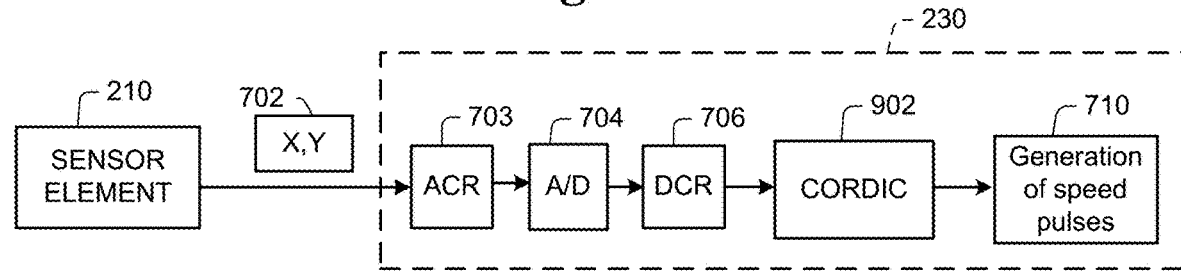

FIG. 9A and FIG. 9B illustrate block diagrams showing some alternative embodiments of functionalities of the electronic circuitry 230 including a CORDIC based method to calculate correct angle position with the use of arctan functionality.

As illustrated in FIG. 9A and FIG. 9B, the sensor element 210 senses the rotation of a target (for example, the shaft 100 in FIG. 1) and generates a first sensing signal component X and a second sensing signal component Y as shown by blocks 702. The first sensing signal component X and the second sensing signal component Y are fed into A/D conversion blocks 704 and subsequently temperature compensation, filtering and/or self-calibration blocks 706. The first sensing signal component X and the second sensing signal component Y are then fed into a CORDIC block 902 to extract an angle information signal. The angle information signal can then fed into some further processing blocks such as a generation of speed pulses block 710 to generate speed pulse signals, as well as absolute angle information, direction information, and/or acceleration information. The first sensing signal component X and the second sensing signal component Y can be sine and cosine curves Vx(cos α) and Vy(sin α) which have a 90° phase shift of a voltage amplitude over a rotation angle α as an example shown in FIG. 10.

Figure 10:
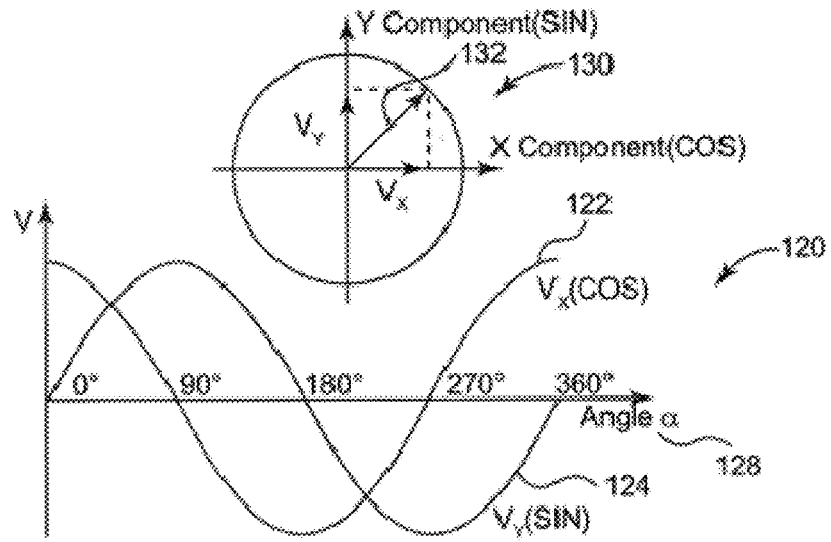
FIG. 10 shows an example signal generated by a sensor device according to some alternative embodiments.

As shown in FIG. 10, a graph 120 illustrates "ideal" output signals Vx(COS) 122 and Vy(SIN) 124 provided by the sensor element 210 as the target to be sensed (e.g. the shaft 100 shown in FIG. 1) rotates from 0 to 360 degrees, as indicated by an angle α at 128. As illustrated by the graph at 130, the output signals Vx(COS) 122 and Vy(SIN) 124 respectively represent X and Y components of a vector 132 indicative of an angular position of the target to be sensed. A Volder's algorithm, also known as CORDIC (coordinate rotation digital computer) algorithm is used by the CORDIC block 902 to calculate and generate the angle information signal indicating the angular position of the target to be sensed.

The CORDIC based method can be effectively implemented on ASIC level and provides a more robust and higher accuracy angle and/or speed sensing. A kind of dynamic accuracy control can also be provided by using the CORDIC based method: for high speed operation only rough angle information is provided while at lower speeds more data is transmitted to achieve the angle information with higher resolution.

Figure 11A:
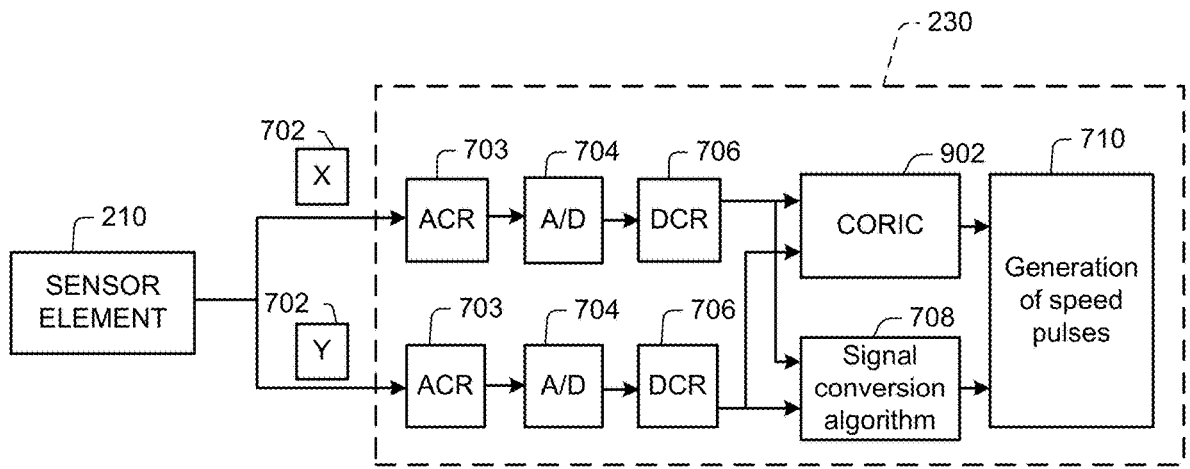
FIG. 11A and FIG. 11B show block diagrams for schematically illustrating functionalities of the sensor device according to some alternative embodiments.
Figure 11B:
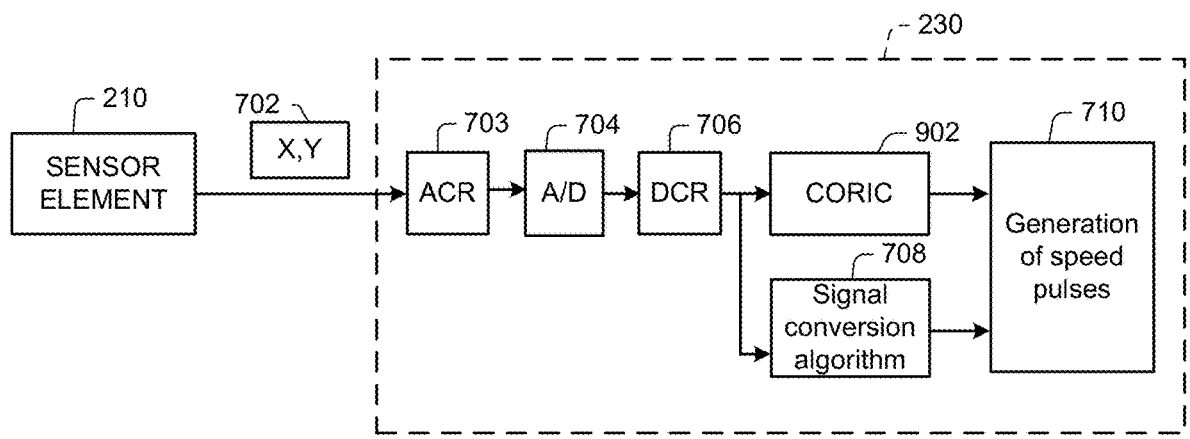

FIG. 11A and FIG. 11B illustrate block diagrams showing some alternative embodiments of functionalities of the electronic circuitry 230 including an advanced dynamic control method to calculate a correct angular position with a combination of a threshold based functionality and a CORDIC functionality. For example, a simple look-up table detection is used at a higher speed range to simplify process and improve speed, while a CORDIC operation is used at a lower speed range to achieve the high angle accuracy.

The electronic circuitry 230 may include a dynamic controller. The dynamic controller may be used for selecting different process methods, depending on an angle change rate, a speed of the target to be sensed, or a safety function among other criteria. The dynamic controller can operate in a first mode and process the sensing signal using the CORDIC based method disclosed above in FIG. 9A, FIG. 9B and FIG. 10 when a pre-set criterion is met, and is switched to a second mode and process the sensing signal using the threshold based method disclosed above in FIG. 7 and FIG. 8 when the pre-set criterion is not met. For example, the dynamic controller can process the sensing signal using the CORDIC based method when the sensed speed is smaller than a pre-determined threshold value such that a higher resolution result is achieved, and is switched to process the sensing signal using the threshold based method when the sensed speed is greater than the pre-determined threshold value such that a lower latency time is achieved. As another example, the dynamic controller can process the sensing signal using the threshold based method when the safety function demands measured rotation angles at a greater sensing rate. The dynamic controller can also process the sensing signal using the CORDIC based method when the safety function demands measured rotation angles at a higher resolution.

In alternative embodiments, the threshold based method and the CORDIC based method can be concurrently applied to measure rotation angles. A first rotation angle and a second rotation angle, which can be measured substantially at the same time using the threshold based method and the CORDIC based method, can be compared for a plausibility safety check: for example, if a difference between the first rotation angle and the second rotation angle are within a pre-determined range, the measurement can be considered as reliable. Otherwise, if the difference between the first rotation angle and the second rotation angle falls outside of the pre-determined range, an error may be flagged. In some alternative embodiments, one of the threshold based method or the CORDIC based method can be used for the plausibility safety check. In these alternative embodiments, the measured rotation angle can be compared with an additional rotation angle which is measured at substantially the same time but which is measured from another measurement source. The measured rotation angle can then be compared to the additional rotation angle to yield a comparison result, which can be evaluated to determine the reliability of the measured rotation angle. In some embodiments, the rotation angles measured at substantially the same time using the threshold based method, the CORDIC based method, and/or other measurement sources are processed to generate an adjusted rotation angle for further processing. The adjusted rotation angle is generated without the reliability check or after the reliability check of the measured rotation angles. The adjusted rotation angle may be calculated by averaging the measured rotation angles. The adjusted rotation angle may also be calculated by selectively omitting some of the measured rotation angles (e.g. omitting measured rotation angles that fall out a pre-determined range) and averaging the remaining of the measured rotation angle. The averaging calculation can be performed either evenly or by assigning different weights to the measured rotation angles. The electronic circuitry 230 may also include a mode selector for selecting different operating modes, such as outputting speed pulse signals, absolute angle information, direction information, and/or acceleration information.

The advanced dynamic control method combines the features of the threshold based method and the CORDIC based method disclosed above, and in addition adds the flexibility to switch between both of these methods. Similar as described above, a sensor element 210 senses the rotation of a target (for example, the shaft 100 in FIG. 1) and generates a first sensing signal component X and a second sensing signal component Y as shown by blocks 702. The first sensing signal component X and the second sensing signal component Y are fed into A/D conversion blocks 704 and subsequently temperature compensation, filtering and/or self-calibration blocks 706. During low speed operation, the first sensing signal component X and the second sensing signal component Y are then fed into a CORDIC block 902 to extract an angle information signal, such that the higher achievable resolution of the CORDIC implementation can be used. While for higher speeds, the first sensing signal component X and the second sensing signal component Y are fed into a signal conversion algorithm block 708 to extract an angle information signal, such that the low latency response of a simple and fast threshold based algorithm is an advantage. The decision which signal path will be used is handled by a speed dependent protocol block 1102 shown at the very end in FIG. 11. In addition, this chip concept may provide additional redundancy for functional safety requirements. For instance, while the high accuracy CORDIC angle information is used the lower accuracy threshold based signal path can be used for plausibility checks.

Figure 4:
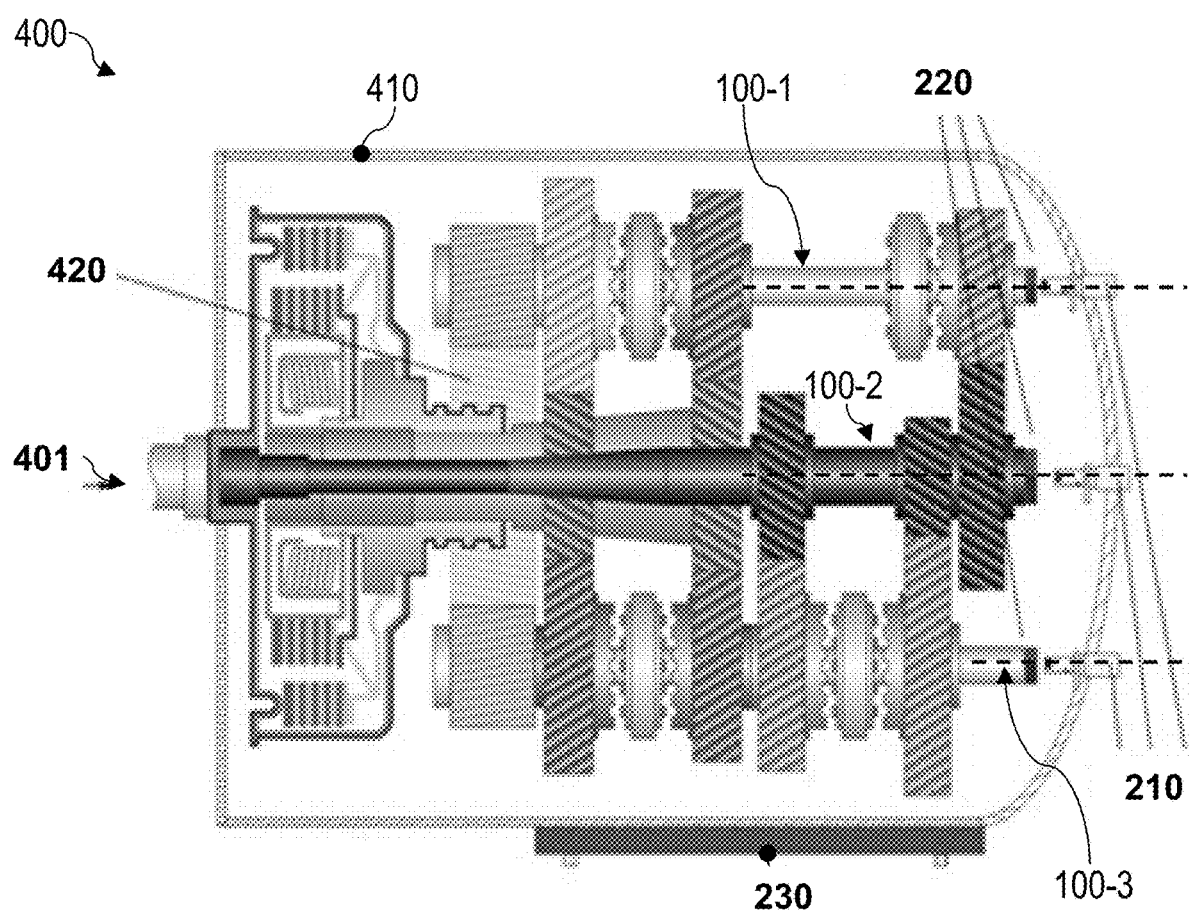
FIG. 4 schematically illustrates a system according to an embodiment comprising a sensor device and a shaft of a transmission of a vehicle.

In FIG. 4, a transmission 400 in the form of a gear box is shown. An input shaft 401 is driven by an engine of a vehicle (not shown in FIG. 4). A transmission output wheel 420 is shown. There are three shafts 100-1, 100-2, 100-3 of the transmission 400. Each one of the three shafts 100-1, 100-2, 100-3 is equipped with a magnet 220 on an end face thereof. A housing 410 rotatably houses the shaft 100-1, 100-2, 100-3. At least parts of the shaft rotate within the housing. In other words, the housing 410 does not rotate together with the shafts 100-1, 100-2, 100-3, it rather encloses an end portion of the shafts 100-1, 100-2, 100-3. A respective bearing may be provided. The magnetic sensor elements 210 associated with the respective three magnets 220 are attached to the housing 410. While FIG. 4 shows the magnet 220 on an end face of each one of the shafts 100-1, 100-2, 100-3, the magnet may without limitation be provided on only some of the shafts. In particular, the sensor elements 210 are positioned at an axial extension of the respective shaft 100-1, 100-2, 100-3 (illustrated in FIG. 4 by the dashed lines) offset by a gap with respect to the magnet 220. It is possible that the sensor elements 210 are displaced against the axial extension of the respective shaft 100-1, 100-2, 100-3. By techniques as mentioned above, it is possible to determine the orientation and/or the rotational speed of the shafts 100-1, 100-2, 100-3.

Figure 5:
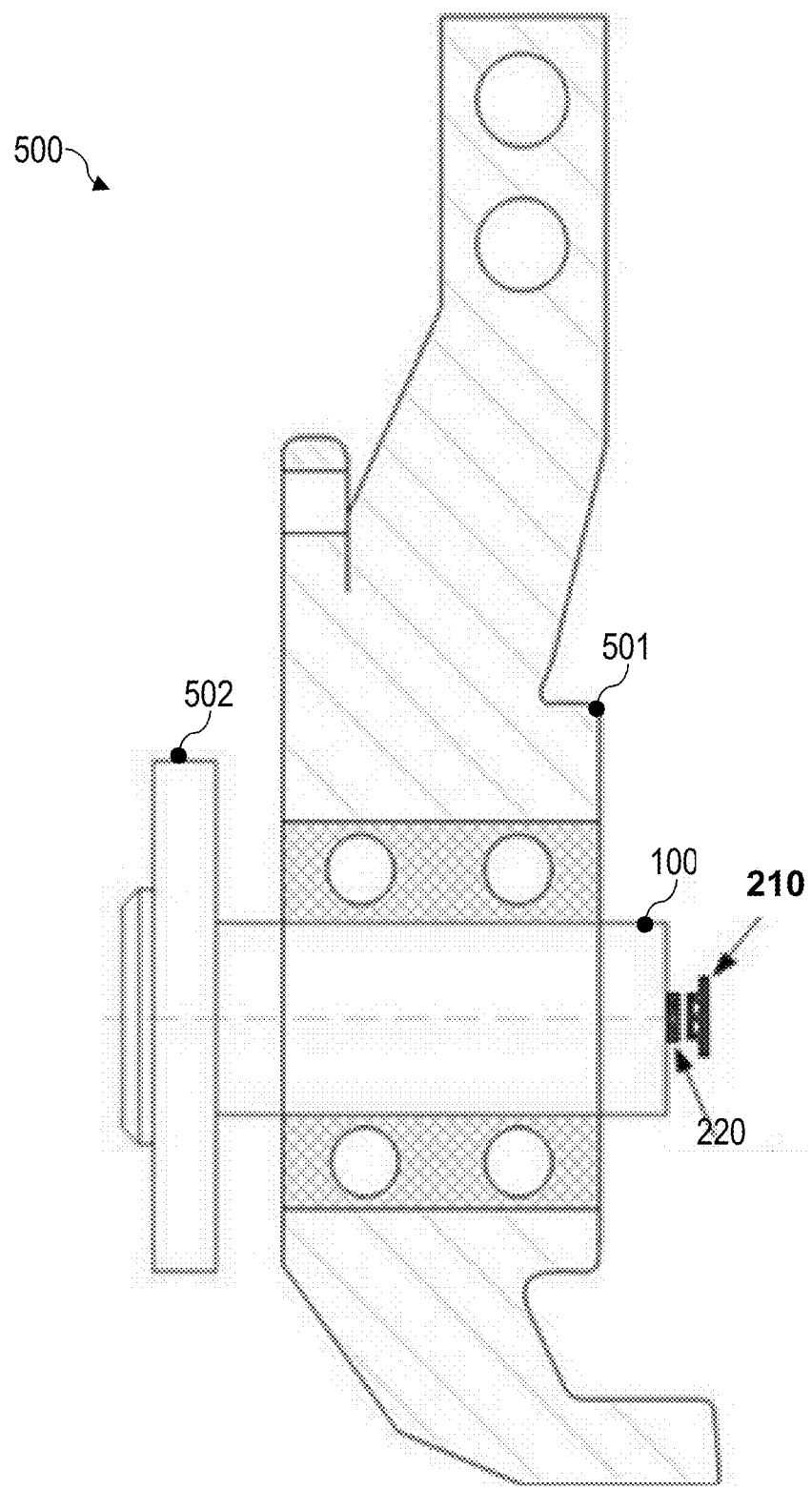
FIG. 5 schematically illustrates a system according to an embodiment where a sensor device and a shaft of a wheel axle of a vehicle are provided.

In FIG. 5, a system 500 comprising a shaft 100 of a wheel axle is shown. An end face of the shaft 100 is provided with the magnet 220. The end face of the shaft 100 is opposite to a wheel bearing 502 of the wheel axle. The shaft 100 is rotatably connected to an axle carrier 501 between the end face and the wheel bearing 502. Further illustrated in FIG. 5 is the sensor element 210 which is positioned at an axial extension of the shaft 100 and offset by a gap with respect to the magnet 200. The sensor element 210 does not rotate together with the shaft 100. By the techniques as mentioned above, it is possible to determine the orientation and/or the rotational speed of the shaft 100.

Figure 6:
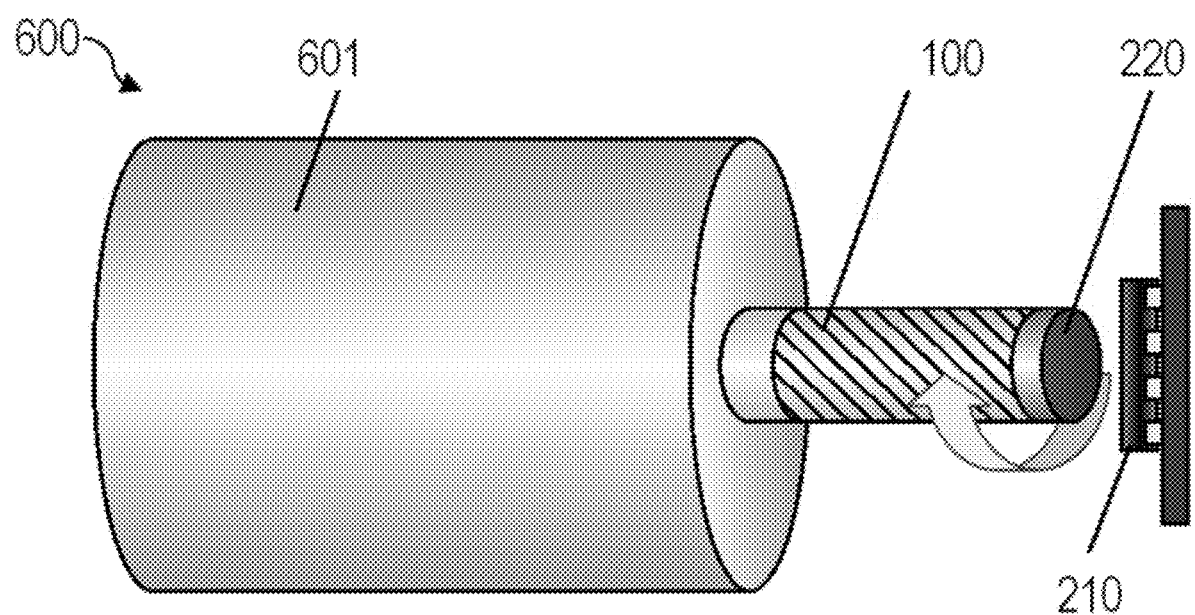
FIG. 6 schematically illustrates a system according to an embodiment where a sensor device and a shaft of a brushless DC motor are provided.

Turning to FIG. 6, a brushless DC motor unit or assembly 600 is shown. A motor 601 of the assembly may be attached to the shaft 100. At the end face of the shaft, the magnet 220 is positioned. At an axial extension of the shaft 100 and offset by a gap, the sensor element 210 is positioned. By techniques as mentioned above, it is possible to determine the orientation and/or the rotational speed of the shaft 100.

A controller (not shown in FIG. 6) of the brushless DC motor assembly 600 may continuously switch a phase of electrical windings to keep the motor 601 turning. The switching may occurs in response to the orientation of the shaft 100. By determining the orientation angle of the magnetic field in the range of between 0° and 360° employing the sensor element 210, it becomes possible to determine the orientation angle of the shaft 100. This allows for accurate control of the brushless DC motor 601.

As can be seen from the above, the techniques may reduce complexity, required space, and costs when sensing the orientation of shafts 100, 100-1, 100-2, 100-3. Significantly less space than in conventional transmissions may be required in the scenario of FIG. 4 with the magnets 220 placed on one or more end faces of the shafts 100-1-100-3 of the transmission 400. In particular, when employing toothed wheels, it may be necessary to occupy additional space on the shafts 100-1-100-3 to mount the latter. Typically, the toothed wheels (as shown in FIG. 3B) are limited to a minimum diameter of approximately 7 cm. Often, when employing conventional magnetic field sensors in the proximity of such toothed wheels, large sensor towers are required in order to bring the magnetic field sensors closer to the toothed wheel. Extra costs are generated and a system complexity typically increases. Further, there is a constant demand for downsizing transmissions 400. When employing a system as mentioned above, both, complexity and required space may be reduced.

Further, in the scenario of FIG. 5, with the magnet 220 being attached to an end face of the shaft 100 of the wheel axle, significantly reduced space and costs are achieved when compared to conventional solutions. In particular, in conventional systems, a toothed wheel is often arranged close to the wheel bearing 502. Typically, this affects overall system dimensions such as increased construction space. Consequently, complexity and the costs are further increased. The respective sensor in conventional systems is further located close to the braking system including the brake disc, brake caliper, and brake shoes; this often results in a high temperature environment. The accuracy of the sensing of the orientation may degrade and an increased wear out of the electronics may result.

It is to be understood that the above-described concepts and embodiments are susceptible to various modifications. For example, various pulse patterns corresponding to various kinds of toothed wheel profiles could be emulated. Such emulation may also be extended to not only emulate the angular position and extension of teeth, but could also emulate further characteristics of the tooth profile, such as a radial dimension of the tooth or slope of the tooth edges. Further, the rotation sensor could use other kinds of sensing devices or other types of magnets, such as more complex multi-pole magnets.

What is claimed is:

1. A sensor device, comprising:
   a magnetic field sensitive element to be positioned in a magnetic field of a magnet positioned on an end face of a shaft, the magnetic field sensitive element sensing an orientation angle of the magnetic field in a range between 0° and 360° and generating a sensing signal comprising a first sensing signal component and a second sensing signal component which have a 90° phase shift; and
   electronic circuitry receiving and processing the sensing signal from the magnetic field sensitive element to generate an angle signal indicating the orientation angle of the magnetic field;
   wherein the electronic circuitry comprises a dynamic controller determining an angular speed and operate under different modes based on the determined angular speed.

2. The sensor device of claim 1, wherein the electronic circuitry comprises:
   a pair of A/D conversion blocks, wherein a first of the pair of the A/D conversion blocks is to digitalize the first sensing signal component, and a second of the pair of A/D conversion blocks is to digitalize the second sensing signal component;
   filtering and self-calibration blocks to filter and calibrate the first and second sensing signal components prior to or after the digitalization;
   a memory storing a look-up table or a threshold based algorithm including compensated threshold values to generate correct amplitude values correlating to the digitalized first and second sensing signal components to achieve a linearized pulse width and extract the angle signal having correct phase values; and
   a speed pulse generator to receive and process the angle signal to generate pulses indicating an angular speed of the shaft.

3. The sensor device of claim 1, wherein the electronic circuitry comprises:
   a pair of A/D conversion blocks to digitalize the first sensing signal component and the second sensing signal component;
   filtering and self-calibration blocks to filter and calibrate the digitalized first and second sensing signal components;
   a processor to receive the digitalized first and second sensing signal components and perform a CORDIC based method to calculate the angle signal indicating the orientation angle of the magnetic field; and
   a speed pulse generator to receive and process the angle signal to generate pulses indicating an angular speed of the shaft.

4. The sensor device of claim 1, wherein the dynamic controller is to operate in a first mode when the angular speed of the shaft is greater than a pre-determined threshold value, when in the first mode the dynamic controller is to calculate the angle signal based on a threshold based algorithm.

5. The sensor device of claim 4, wherein the dynamic controller is to operate in a second mode and process the sensing signal using a CORDIC based method to calculate the angle signal when the angular speed decreases to a value smaller than or equal to the pre-determined threshold value.

6. The sensor device of claim 5, wherein the threshold based algorithm and the CORDIC based method are concurrently used to get a pair of rotation angles which are compared to yield a comparison result, wherein the comparison result is evaluated to determine reliability of the rotation angles.

7. The sensor device of claim 1, wherein the electronic circuitry comprises:
   a mode selector for selecting different operating modes, including outputting one or more of speed pulse signals, absolute angle information, direction information, and acceleration information based on the angle signal.

8. The sensor device of claim 1, wherein the electronic circuitry is integrated in a chip attached to the magnetic field sensitive element.

9. A system, comprising:
   a rotatable shaft;
   a magnet positioned on an end face of the shaft;
   a magnetic field sensitive element positioned in a magnetic field of the magnet, the magnetic field sensitive element sensing an orientation angle of the magnetic field in a range between 0° and 360° and generating a sensing signal; and
   electronic circuitry receiving and processing the sensing signal from the magnetic field sensitive element to generate an angle signal indicating the orientation angle of the magnetic field by selecting different modes depending on an angular speed of the shaft.

10. The system of claim 9, wherein the electronic circuitry is configured to process the sensing signal using a threshold based algorithm including compensated threshold values to generate correct amplitude values correlating to the sensing signal to calculate the angle signal when the angular speed of the shaft has a first relationship with a pre-determined threshold value.

11. The system of claim 10, wherein the electronic circuitry is to process the sensing signal using a CORDIC based method to calculate the angle signal when the angular speed has a second relationship with the pre-determined threshold value different from the first relationship.

12. The system of claim 11,
wherein the electronic circuitry is to determine a first rotation angle and a second rotation angle respectively using the threshold based algorithm and the CORDIC based method, and flag an error based on a comparison of the first rotation angle and the second rotation angle.

13. The system of claim 9, further comprising:
a memory to store a mapping of pulse edges to orientation angles; and
electronic circuitry to generate a signal comprising a pattern of pulses with rising and falling pulse edges, depending on the sensing signal and the stored mapping of pulse edges to orientation angles.

14. The system of claim 9, wherein the electronic circuitry is integrated in a chip attached to the magnetic field sensitive element.

* * * * *